US 9,494,061 B2

(12) United States Patent
    Hatamura et al.

(10) Patent No.: US 9,494,061 B2
(45) Date of Patent: Nov. 15, 2016

(54) VARIABLE VALVE SYSTEM

(71) Applicants: OGINO KOGYO CO., LTD., Hiroshima (JP); HATAMURA ENGINE RESEARCH OFFICE LTD., Hiroshima (JP)

(72) Inventors: Koichi Hatamura, Hiroshima (JP); Jun Bota, Hiroshima (JP); Taizo Fujimura, Hiroshima (JP); Susumu Takayama, Hiroshima (JP)

(73) Assignees: OGINO KOGYO CO., LTD., Hiroshima (JP); HATAMURA ENGINE RESEARCH OFFICE LTD., Hiroshima (JP)

( * ) Notice: Subject to any disclaimer, the term of this patent is extended or adjusted under 35 U.S.C. 154(b) by 209 days.

(21) Appl. No.: 14/547,475

(22) Filed: Nov. 19, 2014

(65) Prior Publication Data

US 2015/0075463 A1    Mar. 19, 2015

Related U.S. Application Data

(63) Continuation of application No. PCT/JP2013/003227, filed on May 21, 2013.

(30) Foreign Application Priority Data

May 21, 2012   (JP) ................. 2012-115977

(51) Int. Cl.
    *F01L 1/34*     (2006.01)
    *F01L 13/00*    (2006.01)
    (Continued)

(52) U.S. Cl.
    CPC ............ *F01L 13/0031* (2013.01); *F01L 1/267* (2013.01); *F01L 13/0063* (2013.01);
    (Continued)

(58) Field of Classification Search
    CPC ......... F01L 1/185; F01L 1/267; F01L 1/344; F01L 1/2405; Y02T 10/18
    USPC .......................................... 123/90.15, 90.17
    See application file for complete search history.

(56) References Cited

U.S. PATENT DOCUMENTS

| 7,458,347 B2 * | 12/2008 | Machida .................. F01L 1/34 123/346 |
| 2005/0092272 A1 | 5/2005 | Shindou |
| 2009/0125211 A1 | 5/2009 | Akihisa et al. |

FOREIGN PATENT DOCUMENTS

| CN | 1611750 A | 5/2005 |
| CN | 101495738 A | 7/2009 |

(Continued)

OTHER PUBLICATIONS

International Search Report; PCT/JP2013/003227; Jul. 16, 2013.

*Primary Examiner* — Ching Chang
(74) *Attorney, Agent, or Firm* — Studebaker & Brackett PC (57) ABSTRACT

A control device controls a valve timing changer to retard a phase of an exhaust valve camshaft with respect to a crankshaft such that the time of opening of an intake valve is earlier than the time of closing the exhaust valve after a top dead center, when a determiner determines that an engine is not in a warm-up stage in a low-load operation. The control device controls the valve timing changer to advance the phase of the exhaust valve camshaft with respect to the crankshaft such that the time of closing the exhaust valve is earlier than the time of opening of the intake valve after the top dead center, when the determiner determines that the engine is at the warm-up stage in the low-load operation.

2 Claims, 5 Drawing Sheets

(51) Int. Cl.
    *F01L 1/26* (2006.01)
    *F02D 13/02* (2006.01)
    *F01L 1/18* (2006.01)
    *F01L 1/24* (2006.01)
    *F01L 1/344* (2006.01)
    *F01L 1/053* (2006.01)
(52) U.S. Cl.
    CPC .......... *F02D 13/0249* (2013.01); *F01L 1/185* (2013.01); *F01L 1/2405* (2013.01); *F01L 1/344* (2013.01); *F01L 2001/0537* (2013.01); *F01L 2013/0068* (2013.01); *F01L 2105/00* (2013.01); *F01L 2800/00* (2013.01); *F01L 2800/02* (2013.01); *Y02T 10/18* (2013.01)

(56) References Cited

FOREIGN PATENT DOCUMENTS

| | | |
|---|---|---|
| JP | 2007-247485 A | 9/2007 |
| JP | 4108295 B2 | 4/2008 |
| JP | 2009-121306 A | 6/2009 |
| JP | 2010-013940 A | 1/2010 |
| JP | 2010-065707 A | 3/2010 |

* cited by examiner

VARIABLE VALVE SYSTEM

CROSS-REFERENCE TO RELATED APPLICATIONS

This is a continuation of International Application No. PCT/JP2013/003227 filed on May 21, 2013, which claims priority to Japanese Patent Application No. 2012-115977 filed on May 21, 2012. The entire disclosures of these applications are incorporated by reference herein.

BACKGROUND

The present disclosure relates to variable valve systems controlling operations of intake and exhaust valves of engines.

It has been generally known that pump loss can be reduced by advancing the time of closing an intake valve in an intake stroke after a piston top dead center of an engine. Accordingly, more and more variable valve systems, which control the lift-off times, the lift, and the operating angles of intake valves, have been and are being mounted in engines.

For example, in a variable valve system shown in Japanese Patent No. 4108295 (paragraphs [0015]-[0030] and FIG. 1), a control shaft is pivotably supported near a rocker arm, and a swing arm lifting off an intake valve via the rocker arm is pivotably attached to the control shaft. The control shaft includes a protrusion having a tip to which a control arm is pivotably attached. A camshaft rotates such that a rotating cam presses the swing arm via the control arm to lift off the intake valve. When the control shaft and the protrusion rotate at a small angle, the swing start angle of the swing arm changes. Then, with the decreasing lift of the intake valve, the operating angle of the intake valve continuously decreases to gradually advance the end of the lift-off. Even if the lift and the operating angle of the intake valve change, pump loss can be reduced without opening and closing a throttle.

SUMMARY

In a warm-up stage of a low-load operation immediately after starting an engine, the engine has a low temperature. When the time of closing the intake valve advances, pump loss in intake decreases. However, the decrease in the pump loss reduces the thermal energy in a combustion chamber, which has been generated by the pump loss until then. This rather deteriorates the combustion efficiency of an air-fuel mixture in the combustion chamber.

In order to address the problem, the following is conceivable. A known variable valve mechanism (hereinafter referred to as VCP) advancing and retarding the phase of a camshaft with respect to a crankshaft is attached to an intake valve camshaft. Only at the warm-up stage, the phase of the intake valve camshaft is retarded such that the time of opening of the intake valve is later than the time of closing the exhaust valve. The end of the operating angle of the exhaust valve does not overlap the start of the operating angle of the intake valve, what is called negative overlap is performed, to increase pump loss at the start of the intake to improve the combustion efficiency of the combustion chamber.

However, if the VCP is attached to the intake valve camshaft in addition to the structure around the intake valve camshaft as shown in Japanese Patent No. 4108295 (paragraphs [0015]-[0030] and FIG. 1), the structure of the engine becomes complicated, thereby increasing costs.

The present disclosure addresses the problem. The present disclosure provides a low-cost variable valve system, which improves the combustion efficiency of an air-fuel mixture in a combustion chamber at a warm-up stage of an engine, and reduces pump loss when the engine is not at the warm-up stage.

One of the features of the present disclosure is as follows. A VCP is attached to an exhaust valve camshaft in advance. The VCP attached in advance to obtain exhaust gas recirculation (hereinafter referred to as EGR) effects varies the time of closing an exhaust valve, depending on whether or not the engine is at the warm-up stage in a low-load operation.

Specifically, a variable valve system according to a first aspect of the present disclosure includes a variable intake valve mechanism including an intake valve, an intake valve camshaft configured to rotate in synchronization with a crankshaft of an engine, and a lift adjuster provided between the intake valve and the intake valve camshaft, and configured to adjust lift of the intake valve; a variable exhaust valve mechanism including an exhaust valve, an exhaust valve camshaft configured to rotate in synchronization with the crankshaft of the engine, and a valve timing changer attached to the exhaust valve camshaft and configured to change valve timing of the exhaust valve; and a controller connected to the lift adjuster and the valve timing changer, and configured to output operation signals to the lift adjuster and the valve timing changer. The controller includes a determiner configured to determine whether or not the engine is in a warm-up stage. The controller controls the lift adjuster to decrease an operating angle of the intake valve with decreasing lift of the intake valve to gradually advance an end of lifting off the intake valve to bring the engine into a low-load operation, and to increase the operating angle of the intake valve with increasing lift of the intake valve to retard the end of lifting off the intake valve to bring the engine into a high-load operation. The controller controls the valve timing changer to retard a phase of the exhaust valve camshaft with respect to the crankshaft such that a time of opening of the intake valve is earlier than a time of closing the exhaust valve after a piston top dead center, when the determiner determines that the engine is not at the warm-up stage in the low-load operation, and to advance the phase of the exhaust valve camshaft with respect to the crankshaft such that the time of closing the exhaust valve is earlier than the time of opening of the intake valve after the piston top dead center, when the determiner determines that the engine is at the warm-up stage in the low-load operation.

According to a second aspect of the present disclosure, in the first aspect, the controller controls a period between the time of closing the exhaust valve and the time of opening of the intake valve to fall within a rotation angle of the crankshaft ranging from 0° and 30°, both inclusive, when the determiner determines that the engine is at the warm-up stage in the low-load operation.

In the first aspect, when the engine is not at the warm-up stage in the low-load operation, the lift adjuster advances the time of closing the intake valve to decrease the operating angle of the intake valve, thereby reducing pump loss. On the other hand, when the engine is at the warm-up stage in the low-load operation, the end of the operating angle of the exhaust valve does not overlap the start of the operating angle of the intake valve, what is called negative overlap occurs, after the piston top dead center. Thus, the combustion chamber has negative pressure at the start of the intake, thereby causing pump loss. Accordingly, even when the engine has a low temperature, the thermal energy of the combustion chamber increases to improve the combustion efficiency of the air-fuel mixture in the combustion chamber. In addition, the VCP attached to the exhaust valve camshaft in advance is utilized to change the relation between the time of closing the exhaust valve and the time of opening of the intake valve. That is, no VCP is attached to the intake valve camshaft, thereby simplifying the structure of the engine to reduce costs.

In the second aspect, at the warm-up stage of the low-load operation, the combustion efficiency of the air-fuel mixture in the combustion chamber reliably improves, while suppressing pump loss as much as possible.

DETAILED DESCRIPTION

An embodiment of the present disclosure will be described hereinafter in detail with reference to the drawings. The following description of the embodiment is a mere example.

Figure 1:
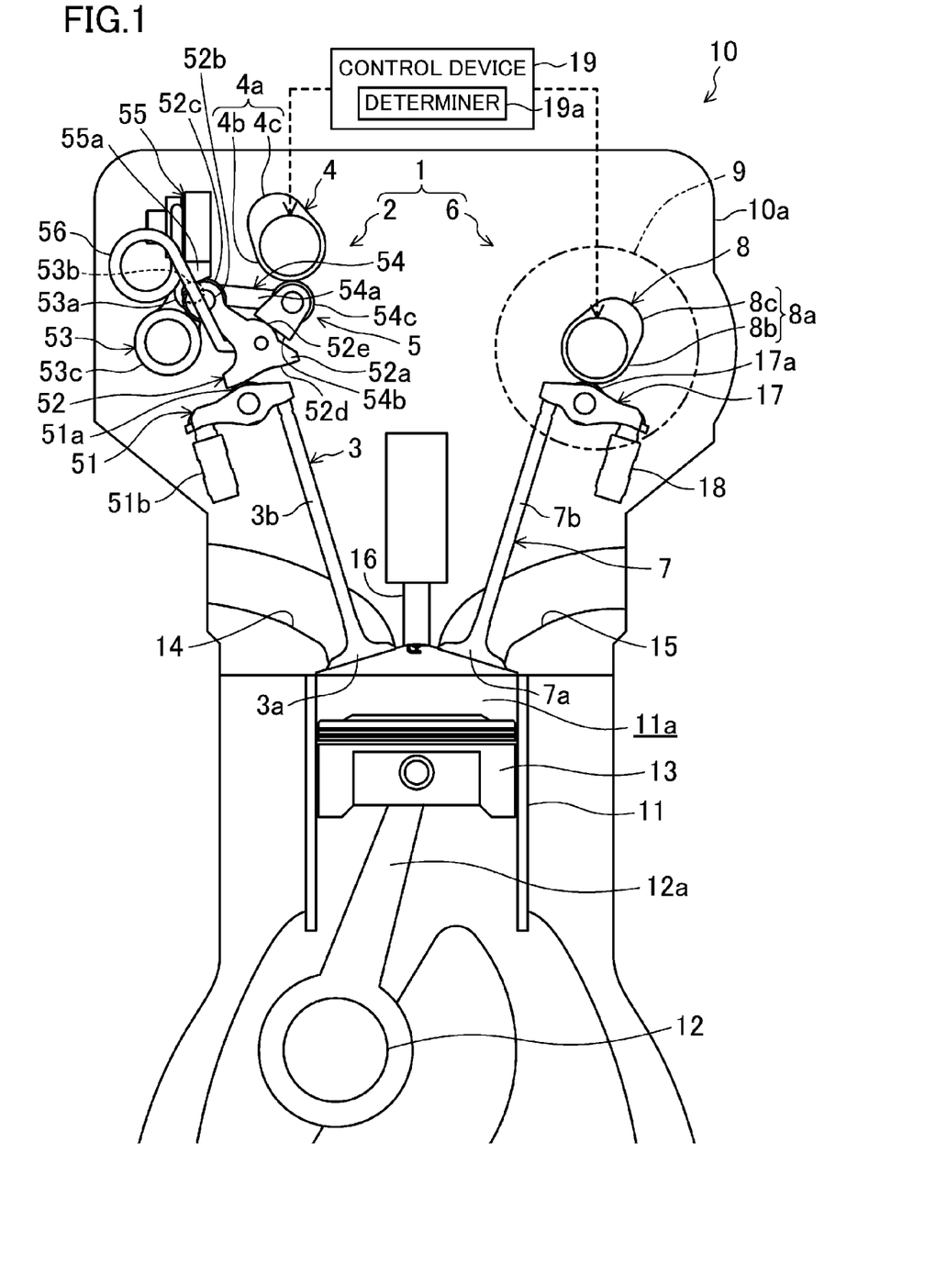
FIG. 1 is a schematic structural view of an engine including a variable valve system according to an embodiment of the present disclosure.

FIG. 1 illustrates an engine 10 including a variable valve system 1 according to the embodiment of the present disclosure. The engine 10 includes a plurality of cylinders 11 arranged in series in the direction in which a crankshaft 12 extends. A piston 13 is fitted into each of the cylinders 11, and reciprocally moves up and down. The piston 13 is connected to the crankshaft 12 via a connecting rod 12a. A spark plug 16 is provided in a cylinder head 10a with an electrode facing a combustion chamber 11a of each cylinder 11.

In FIG. 1, on the upper left of the cylinder 11, two intake ports 14 are provided in parallel in the axial direction of the crankshaft 12, and are open to an upper portion of the cylinder 11. In FIG. 1, on the upper right of the cylinder 11, two exhaust ports 15 are provided in parallel in the axial direction of the crankshaft 12, and are open to an upper portion of the cylinder 11. FIG. 1 shows only one of the intake ports 14 and one of the exhaust ports 15.

A variable intake valve mechanism 2 is provided at the intake port 14 side of the cylinder head 10a.

Figure 2:
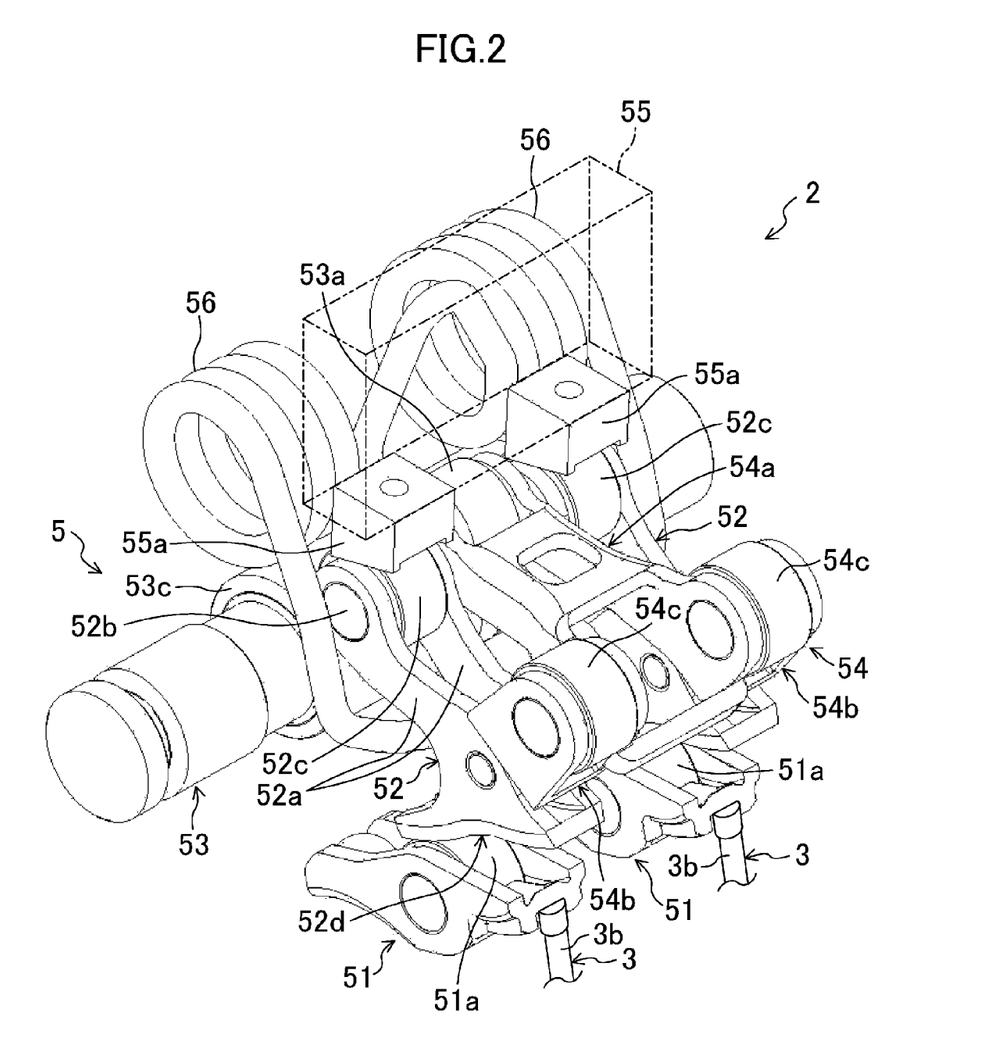
FIG. 2 is a perspective view of a variable intake valve mechanism.

As shown in FIG. 2, the variable intake valve mechanism 2 includes intake valves 3, each of which is provided at the opening portion of one of the intake ports 14, an intake valve camshaft 4 rotating in synchronization with the crankshaft 12, and a lift adjuster (i.e., a lift adjusting section) 5 adjusting the lift of the intake valves 3. The lift adjuster 5 is provided between the intake valves 3 and the intake valve camshaft 4.

Each intake valve 3 includes a bell-shaped portion 3a opening and closing the corresponding one of the intake ports 14, and a stem portion 3b extending obliquely upward from the bell-shaped portion 3a to the direction opposite to the exhaust ports 15. A valve spring (not shown) is provided around the stem portion 3b. The valve spring applies force to the intake valve 3 to close the intake port 14.

The intake valve camshaft 4 is rotatably supported above the intake valves 3 in the cylinder head 10a to extend in the axial direction of the crankshaft 12.

The intake valve camshaft 4 includes a plurality of rotating cams 4a in the axial direction of the crankshaft 12 at predetermined intervals. Each rotating cam 4a includes a base circle 4b, and a cam nose 4c projecting from the base circle 4b in the radius direction.

The lift adjuster 5 includes a pair of rocker arms 51 for lifting off the intake valves 3.

Each rocker arm 51 extends in a substantially horizontal direction to intersect the axial direction of the crankshaft 12. A roller 51a whose rotational axis extends in the axial direction of the crankshaft 12 is rotatably provided in the middle of the rocker arm 51.

One longitudinal end of each rocker arm 51 is rockably supported by a hydraulic lash adjuster 51b via a spherical pivot structure. The rocker arm 51 rocks around the support portion such that the other longitudinal end of the rocker arm 51 presses the upper end of the stem portion 3b of the intake valve 3 downward to lift off the intake valve 3.

A pair of swing arms 52 is provided above the rocker arms 51 to correspond to the rocker arms 51.

Each swing arm 52 extends obliquely upward from an upper portion of the roller 51a in the direction opposite to the exhaust ports 15, and includes a pair of side plates 52a provided in the axial direction of the crankshaft 12 at a predetermined distance and facing each other.

Each swing arm 52 is swingable around a swing shaft 52b extending in the axial direction of the crankshaft 12 at the upper ends of the both side plates 52a. A roller 52c rotating around the swing shaft 52b is provided between the upper ends of the both side plates 52a.

On the other hand, a first pressing portion 52d bridging the lower ends of the side plates 52a is provided at the lower ends. The first pressing portion 52d is curved and raised in the middle as viewed from the axial direction of the crankshaft 12.

A curved surface 52e, which is curved upward as viewed from the axial direction of the crankshaft 12, is formed at an edge above the lower ends of the side plates 52a.

A control shaft 53, which extends in the axial direction of the crankshaft 12, is rotatably supported by the cylinder head 10a in a position obliquely below the roller 52c at the side opposite to the exhaust ports 15. The control shaft 53 includes a control lever 53a changing the lift and the operating angles of the intake valves 3. The control shaft 53 and the control lever 53a rotate integrally.

The control lever 53a protrudes between the upper ends of the both swing arms 52. A rotating shaft 53b, which extends in the axial direction of the crankshaft 12, is rotatably provided in the protrusion.

A pair of eccentric rings 53c is externally fitted on the control shaft 53 to correspond to the rollers 52c. The outer peripheral surface of each eccentric ring 53c is in contact with the outer peripheral surface of the corresponding roller 52c at the bottom of the roller 52c.

A control arm 54 in a substantial T-shape as viewed from above is provided above the both swing arms 52.

The control arm 54 includes a body 54a extending in a substantially horizontal direction to intersect the axial direction of the crankshaft 12. One longitudinal end of the body 54a is swingably and pivotably supported by the rotating shaft 53b of the control lever 53a.

On the other hand, at the other longitudinal end of the body 54a, a pair of second pressing portions 54b corresponding to the curved surfaces 52e at the lower ends of the swing arms 52 is provided in the axial direction of the crankshaft 12 to be spaced apart from each other.

Each second pressing portion 54b has a substantially U-shaped cross-section open to the obliquely upper portion toward the exhaust ports 15. The lower end of each second pressing portion 54b is a plane in contact with the curved surface 52e of the corresponding swing arm 52.

A roller 54c, which has a rotational axis extending in the axial direction of the crankshaft 12, is rotatably provided at the inner side of each second pressing portion 54b. The outer peripheral surfaces of the rollers 54c are in contact with the outer peripheral surfaces of two of the rotating cams 4a corresponding to the rollers 54c at the bottoms of the two rotating cams 4a.

A rectangular fixed block 55, which extends in the axial direction of the crankshaft 12, is fixed to the cylinder head 10a above the upper ends of the both swing arms 52.

A pair of support blocks 55a, each of which has a lower surface in contact with the outer peripheral surface of one of the rollers 52c, protrudes from the lower surface of the fixed block 55 in the positions corresponding to the rollers 52c.

The support blocks 55a and the eccentric rings 53c support the rollers 52c. In the support, the swing center of each swing arm 52 is located at the corresponding one of the rollers 52c.

A pair of torsion coil springs 56 corresponding to the swing arms 52 is provided at the side of the fixed block 55, which is opposite to the exhaust ports 15.

While one ends of the torsion coil springs 56 are fixed to the fixed block 55, the other ends catch the lower ends of the swing arms 52 at the bottoms of the swing arms 52 to apply upward force to the swing arms 52.

The intake valve camshaft 4 rotates in synchronization with the crankshaft 12. When the cam noses 4c of the rotating cams 4a press the rollers 54c from above, the control arm 54 pivots downward on the rotating shaft 53b. Then, the second pressing portions 54b of the control arm 54 press the curved surfaces 52e of the swing arms 52 downward against the force of the torsion coil springs 56.

When the curved surfaces 52e are pressed downward, the swing arms 52 pivot downward on the respective rollers 52c such that the first pressing portions 52d of the swing arms 52 press the rollers 51a of the rocker arms 51 downward against the force of the valve springs (not shown).

When the rollers 51a are pressed downward, the rocker arms 51 pivot downward on one longitudinal ends of the rocker arms 51 such that the other longitudinal ends of the rocker arms 51 press the upper ends of the stem portions 3b of the intake valves 3. This lifts off the intake valves 3 to open the intake ports 14.

On the other hand, the intake valve camshaft 4 further rotates such that the cam noses 4c of the rotating cams 4a do not press the rollers 54c from above. The force of the torsion coil springs 56 and the valve springs (not shown) allows the control arm 54 to pivot upward. In conjunction with this movement, the swing arms 52 also pivot upward, thereby bringing the rocker arms 51 and the intake valves 3 back to the original positions to close the intake ports 14.

When the control shaft 53 rotates to pivot the control lever 53a, the rotating shaft 53b moves to and away from the rollers 52c of the swing arms 52. This changes the positional relation between the intake valve camshaft 4 and the rollers 54c of the control arm 54, and the positional relation between the second pressing portions 54b of the control arm 54 and the curved surfaces 52e of the swing arms 52. As a result, the distance between the rotating shaft 53b and the contact position between each second pressing portion 54b and the corresponding curved surface 52e changes, thereby changing the angle of the corresponding swing arm 52 before pivoting (i.e., the angle at the start of the swing). This change in the angle of the swing arm 52 changes the contact position between the corresponding first pressing portion 52d and the roller 51a.

Figure 3:
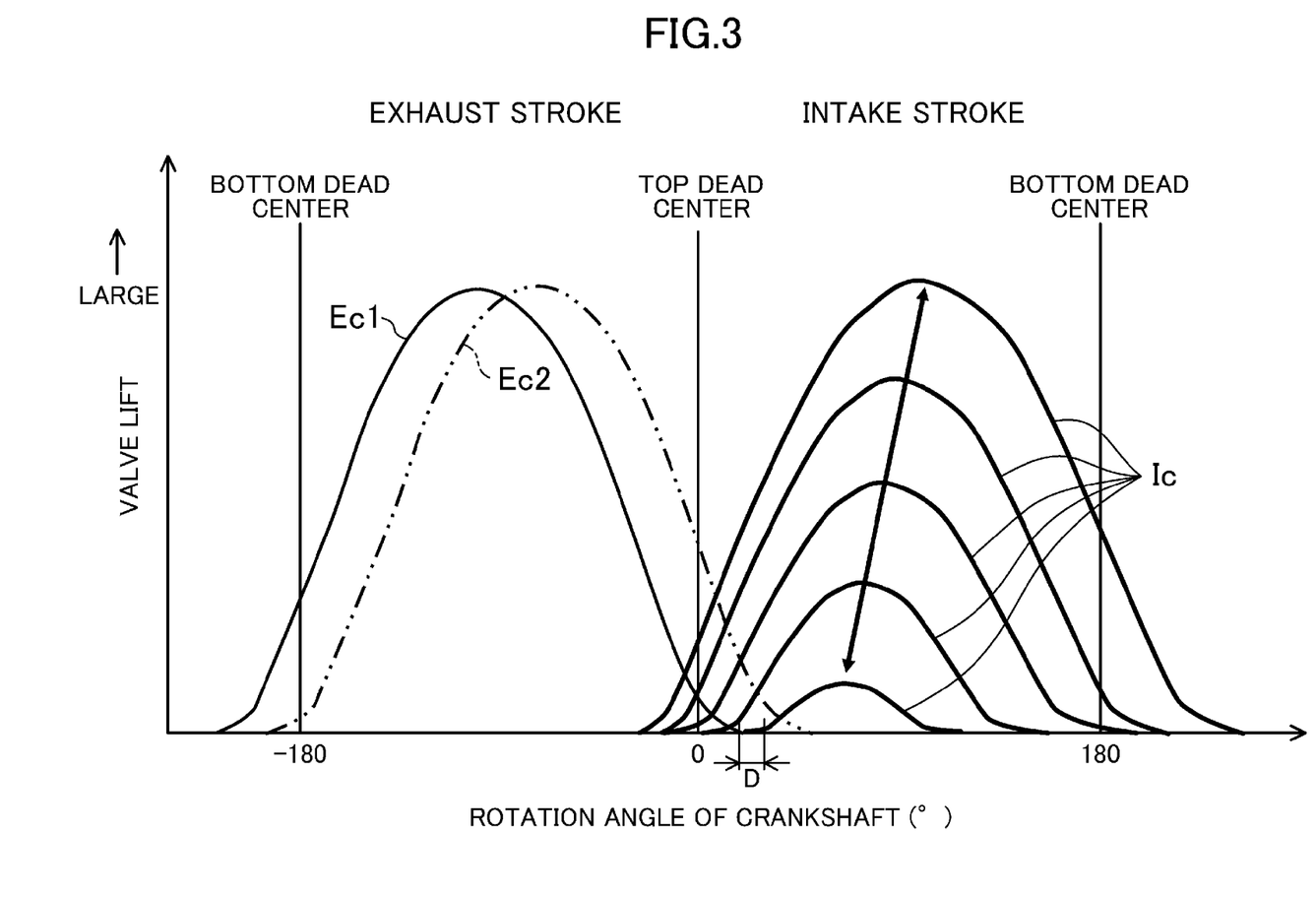
FIG. 3 is a graph illustrating the relation between the rotation angle of a crankshaft and the lift of intake and exhaust valves.

In FIG. 1, when the control lever 53a pivots counterclockwise, the rotating shaft 53b gradually moves away from the rollers 52c of the swing arms 52, thereby gradually increasing the distance between the rotating shaft 53b and the contact position between each second pressing portion 54b and the corresponding curved surface 52e. Then, the contact position between the corresponding first pressing portion 52d and the roller 51a shifts toward the exhaust ports 15. As shown in lift curves Ic of FIG. 3, the lift of the intake valves 3 and the operating angles of the intake valves 3 increase. In addition, the end of lifting off the intake valves 3 retards.

On the other hand, in FIG. 1, when the control lever 53a pivots clockwise, the rotating shaft 53b gradually comes close to the rollers 52c of the swing arms 52, thereby gradually decreasing the distance between the rotating shaft 53b and the contact position between each second pressing portion 54b and the corresponding curved surface 52e. Then, the contact position between the corresponding first pressing portions 52d and the roller 51a shifts in the direction opposite to the exhaust ports 15. As shown in lift curves Ic of FIG. 3, with the decreasing lift of the intake valves 3, the operating angles of the intake valves 3 decrease. In addition, the end of lifting off the intake valves 3 advances.

A variable exhaust valve mechanism 6 is provided at the exhaust port 15 side of the cylinder head 10a.

As shown in FIG. 1, the variable exhaust valve mechanism 6 includes exhaust valves 7, each of which is provided at the opening portion of one of the exhaust ports 15, an exhaust valve camshaft 8 rotating in synchronization with the crankshaft 12, and a valve timing changer (i.e., a valve timing changing section) 9 changing the valve timing of the exhaust valves 7.

The exhaust valves 7 have the same structure as the intake valves 3. Each exhaust valve 7 includes a bell-shaped portion 7a opening and closing the corresponding one of the exhaust ports 15, and a stem portion 7b extending obliquely upward from the bell-shaped portion 7a to the direction opposite to the intake ports 14. A valve spring (not shown) applies force to the exhaust valve 7 to close the exhaust port 15.

Rocker arms 17 and lash adjusters 18 are provided above the exhaust valves 7. The rocker arms 17 have the same structure as the rocker arms 51 of the variable intake valve mechanism 2. The lash adjusters 18 have the same structure as the lash adjusters 51b of the variable intake valve mechanism 2.

The exhaust valve camshaft 8 is rotatably supported above the exhaust valves 7 in the cylinder head 10a to extend in the axial direction of the crankshaft 12.

The exhaust valve camshaft 8 includes a plurality of rotating cams 8a in the axial direction of the crankshaft 12 at predetermined intervals. Each rotating cam 8a includes a base circle 8b, and a cam nose 8c projecting from the base circle 8b in the radius direction.

Two of the rotating cams 8a are in contact with the outer peripheral surfaces of rollers 17a of the rocker arms 17 at the tops of the rollers 17a. The exhaust valve camshaft 8 rotates in synchronization with the crankshaft 12. When the cam noses 8c of the rotating cams 8a press the rollers 17a from above against the force of the valve springs (not shown), the rocker arms 17 pivot on one longitudinal ends of the rocker arms 17 such that the other longitudinal ends of the rocker arms 17 press the upper ends of the stem portions 7b of the exhaust valves 7 downward. This lifts off the exhaust valves 7 to open the exhaust ports 15.

On the other hand, the exhaust valve camshaft 8 further rotates such that the cam noses 8c of the rotating cams 8a do not press the rollers 17a from above. The force of the valve springs (not shown) brings the exhaust valves 7 back to the original position to close the exhaust ports 15.

The valve timing changer 9 has a publicly known variable valve mechanism what is called VCP, and is attached to one longitudinal end of the exhaust valve camshaft 8.

The valve timing changer 9 advances and retards the phase of the exhaust valve camshaft 8 with respect to the crankshaft 12. When the phase advances, the end of lifting off the exhaust valves 7 advances as shown in the lift curves Ec1 of FIG. 3. On the other hand, when the phase retards, the end of lifting off the exhaust valves 7 retards as shown in the lift curves Ec2 of FIG. 3.

The lift adjuster 5 and the valve timing changer 9 are connected to a control device (controller) 19 outputting operation signals to the lift adjuster 5 and the valve timing changer 9.

The control device 19 includes a determiner 19a determining whether or not the engine 10 is in a warm-up stage. The determiner 19a determines based on whether or not a temperature at an upper portion of the engine 10 measured by a temperature sensor (not shown) is equal to or lower than a predetermined value.

The control device 19 controls the lift adjuster 5 to allow the control shaft 53 to rotate clockwise in FIG. 1 using an actuator (not shown) to decrease the operating angles of the intake valves 3 with the decreasing lift of the intake valves 3 to gradually advance the end of lift-off. Then, the engine comes into a low load state. On the other hand, the control device 19 controls the lift adjuster 5 to allow the control shaft 53 to rotate counterclockwise in FIG. 1 using the actuator (not shown) to increase the operating angles of the intake valves 3 with the increasing lift of the intake valves 3 to retarding the end of lift-off. Then, the engine comes into a high load state.

The control device 19 controls the valve timing changer 9 to retard the phase of the exhaust valve camshaft 8 with respect to the crankshaft 12 such that the time of opening of the intake valves 3 is earlier than the time of closing the exhaust valves 7 after the top dead center of the piston 13, when the determiner 19a determines that the engine is not at the warm-up stage in the low load state. On the other hand, the control device 19 controls the valve timing changer 9 to advance the phase of the exhaust valve camshaft 8 with respect to the crankshaft 12 such that the time of closing the exhaust valves 7 is earlier than the time of opening of the intake valves 3 after the top dead center of the piston 13, when the determiner 19a determines that the engine is at the warm-up stage in the low-load operation.

In addition, when the determiner 19a determines that the engine is at the warm-up stage in the low-load operation, the control device 19 sets negative overlap D from the time of closing the exhaust valves 7 to the time of opening of the intake valves 3 at the rotation angle of the crankshaft 12 ranging from 0° to 30°, both inclusive.

The negative overlap D preferably ranges from 0° to 30° for the following reasons. The time of closing the exhaust valves 7 preferably falls within a range from 0° to 10° after the top dead center and the time of opening of the intake valves 3 preferably ranges from 0° to 30° after the top dead center to obtain at least EGR effects at the warm-up stage in the low-load operation.

When the engine is not at the warm-up stage in the low-load operation, the time of closing the exhaust valves 7 preferably falls within a range from 20° to 40° after the top dead center to improve the EGR effects.

At this time, overlap between the end of the operating angles of the exhaust valves 7 and the start of the operating angles of the intake valves 3 is preferably about 10°.

Figure 5:
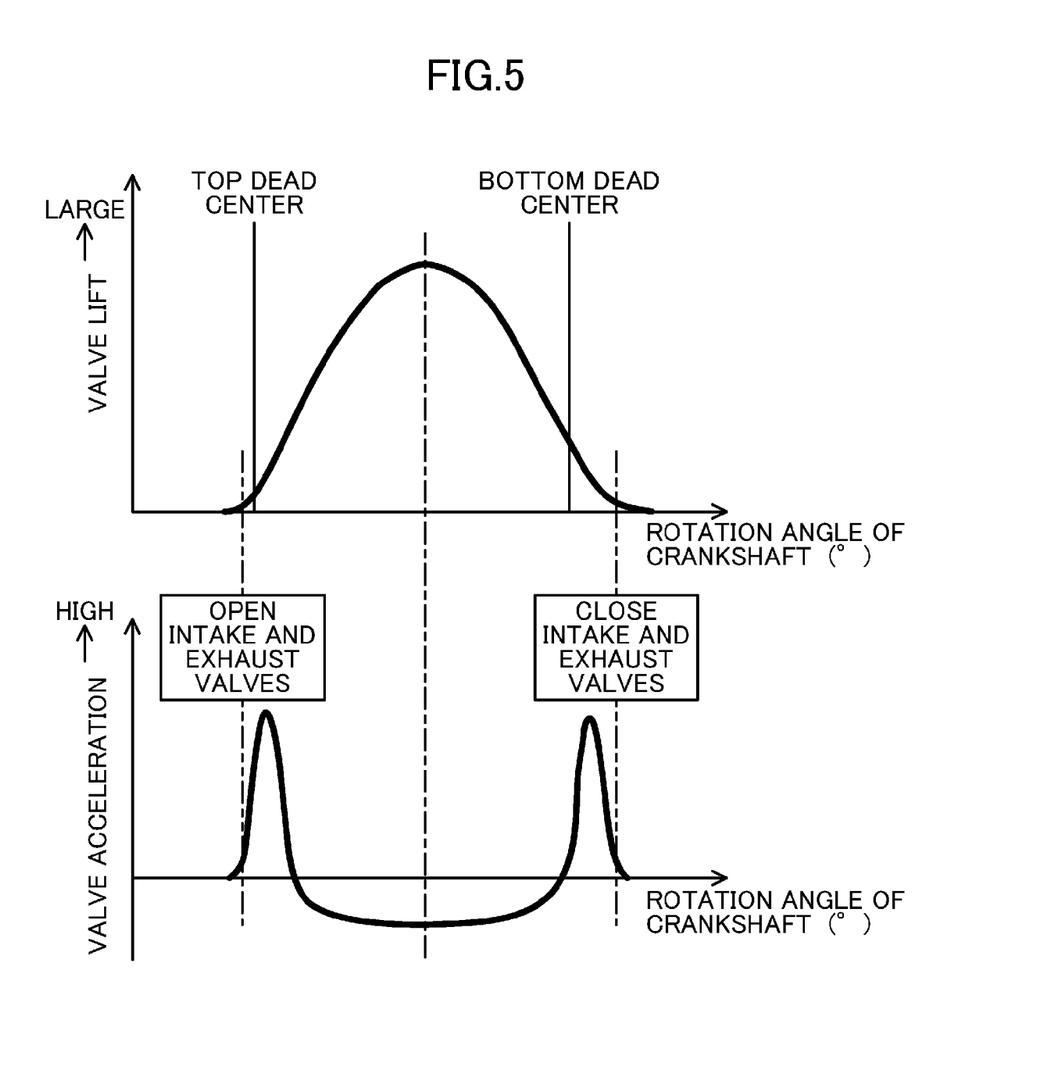
FIG. 5 is a graph illustrating the definition of lift-off times of intake and exhaust valves.

As shown in FIG. 5, the operating angles of the intake valves 3 and the exhaust valves 7 denote the period except for a gentle upward ramp at the start of lifting off the intake valves 3 and the exhaust valves 7 and a gentle downward ramp at the end of the lift-off. At the times of opening and closing of the intake valves 3 and the exhaust valves 7, the acceleration of the intake valves 3 and the exhaust valves 7 largely changes.

Figure 4:
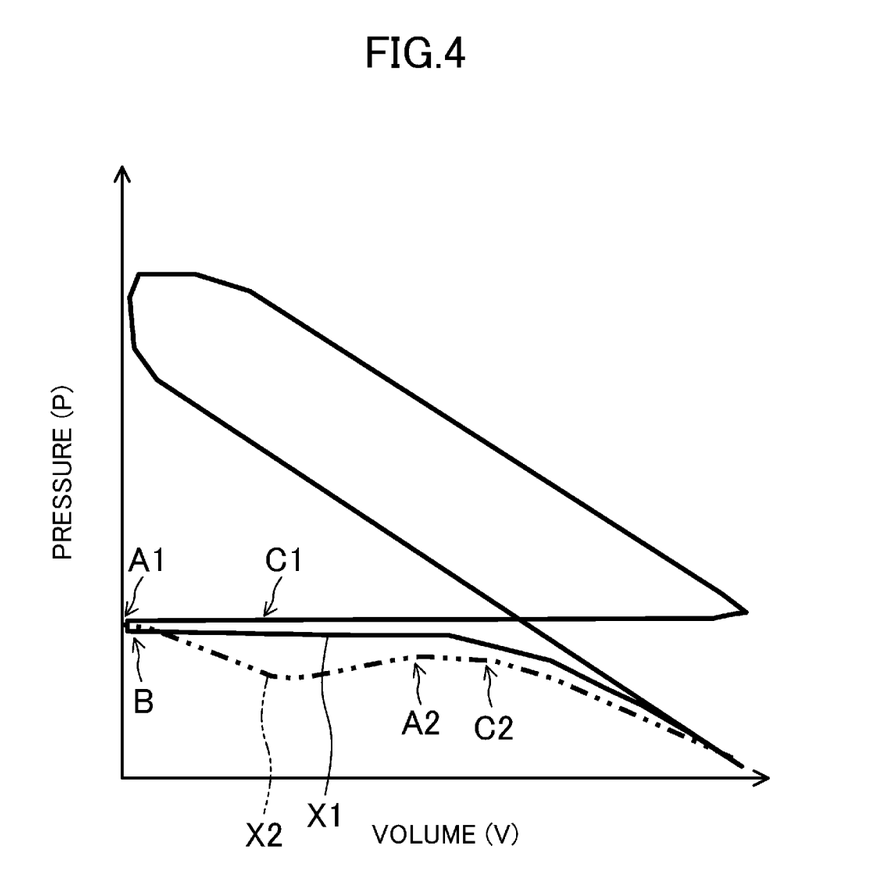
FIG. 4 is a PV diagram of the engine including the variable valve system according to the embodiment of the present disclosure.

Next, the relation between the pressure and the volume of the combustion chamber 11a when the engine 10 is in the low-load operation will be described below.

As shown in FIG. 4, when the engine is not at the warm-up stage in the low-load operation, the relation between the pressure and the volume of the combustion chamber 11a in the intake stroke of the engine 10 is indicated by a curve X1. The curve X1 shows that the intake valves 3 are opened at a point A1 after the top dead center of the piston 13, and then the intake valves 3 are closed early at a point A2 to decrease the operating angles, thereby reducing pump loss at the intake.

On the other hand, when the engine is at the warm-up stage in the low-load operation, the relation between the pressure and the volume of the combustion chamber 11a in the intake stroke of the engine 10 is indicated by a curve X2. The curve X2 shows that the combustion chamber 11a has negative pressure at an initial stage of the intake stroke to cause pump loss. The reason follows. The exhaust valves 7 are closed at a point B after the top dead center of the piston 13. After a predetermined period, the intake valves 3 are opened at a point C1. In this predetermined period, the combustion chamber 11a is sealed up to generate the negative pressure. After that, the intake valves 3 are closed at a point C2 to seal up the combustion chamber 11a to generate the negative pressure in the combustion chamber 11a.

As described above, in the embodiment of the present disclosure, when the engine is not at the warm-up stage in the low-load operation, the lift adjuster 5 advances the time of closing the intake valves 3 to decrease the operating angles of the intake valves 3, thereby reducing pump loss. On the other hand, when the engine is at the warm-up stage in the low-load operation, the end of the operating angles of the exhaust valves 7 does not overlap the start of the operating angles of the intake valves 3, that is, negative overlap occurs, after the piston top dead center. Thus, the combustion chamber 11a has negative pressure at the start of the intake, thereby causing pump loss. Therefore, even when the engine 10 has a low temperature, the thermal energy of the combustion chamber 11a increases to improve the combustion efficiency of the air-fuel mixture in the combustion chamber 11a. In addition, the VCP attached to the exhaust valve camshaft 8 is utilized to change the relation between the time of closing the exhaust valves 7 and the time of opening of the intake valves 3. That is, no VCP is attached to the intake valve camshaft 4, thereby simplifying the structure of the engine 10 to reduce costs.

At the warm-up stage of the low-load operation, the combustion efficiency of the air-fuel mixture in the combustion chamber 11a reliably improves, while suppressing pump loss as much as possible.

In the embodiment of the present disclosure, whether or not the engine is at the warm-up stage is determined based on whether or not the temperature of the upper portion of the engine 10 measured by the temperature sensor (not shown) is equal to or lower than the predetermined value. The determination is not limited thereto. A predetermined period immediately after the start of the engine 10 may be regarded as the warm-up stage, and the time after the predetermined period may be regarded as the non-warm-up stage.

The present disclosure is suitable for a variable valve system controlling the lift of intake and exhaust valves of an engine.

What is claimed is:

1. A variable valve system comprising:
    a variable intake valve mechanism including
        an intake valve,
        an intake valve camshaft configured to rotate in synchronization with a crankshaft of an engine, and
        a lift adjuster provided between the intake valve and the intake valve camshaft, and configured to adjust lift of the intake valve;
    a variable exhaust valve mechanism including
        an exhaust valve,
        an exhaust valve camshaft configured to rotate in synchronization with the crankshaft of the engine, and
        a valve timing changer attached to the exhaust valve camshaft and configured to change valve timing of the exhaust valve; and
    a controller connected to the lift adjuster and the valve timing changer, and configured to output operation signals to the lift adjuster and the valve timing changer, wherein
    the controller includes a determiner configured to determine whether or not the engine is in a warm-up stage,
    the controller controls the lift adjuster
        to decrease an operating angle of the intake valve with decreasing lift of the intake valve to gradually advance end of lifting off the intake valve to bring the engine into a low-load operation, and
        to increase the operating angle of the intake valve with increasing lift of the intake valve to retard the end of lifting off the intake valve to bring the engine into a high-load operation, and
    the controller controls the valve timing changer
        to retard a phase of the exhaust valve camshaft with respect to the crankshaft such that a time of opening of the intake valve is earlier than a time of closing the exhaust valve after a piston top dead center, when the determiner determines that the engine is not at the warm-up stage in the low-load operation, and
        to advance the phase of the exhaust valve camshaft with respect to the crankshaft such that the time of closing the exhaust valve is earlier than the time of opening of the intake valve after the piston top dead center, when the determiner determines that the engine is at the warm-up stage in the low-load operation.

2. The variable valve system of claim 1, wherein
    the controller controls a period between the time of closing the exhaust valve and the time of opening of the intake valve to fall within a rotation angle of the crankshaft ranging from 0° and 30°, both inclusive, when the determiner determines that the engine is at the warm-up stage in the low-load operation.

* * * * *